US010735459B2

(12) United States Patent
Rodniansky et al.

(10) Patent No.: US 10,735,459 B2
(45) Date of Patent: *Aug. 4, 2020

(54) SERVICE OVERLOAD ATTACK PROTECTION BASED ON SELECTIVE PACKET TRANSMISSION

(71) Applicant: International Business Machines Corporation, Armonk, NY (US)

(72) Inventors: Leonid Rodniansky, Allston, MA (US); Viktor Ginzburg, Newton Center, MA (US); Christopher J. Berube, Westminster, MA (US); Sagi Shechter, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 15/801,492

(22) Filed: Nov. 2, 2017

(65) Prior Publication Data

US 2019/0132353 A1 May 2, 2019

(51) Int. Cl.
*H04L 29/00* (2006.01)
*H04L 29/06* (2006.01)
(Continued)

(52) U.S. Cl.
CPC .......... *H04L 63/1458* (2013.01); *G06F 9/542* (2013.01); *H04L 49/9089* (2013.01);
(Continued)

(58) Field of Classification Search
CPC . H04L 63/1458; H04L 63/20; H04L 67/2804; H04L 67/14; H04L 49/9089;
(Continued)

(56) References Cited

U.S. PATENT DOCUMENTS 5,991,503 A * 11/1999 Miyasaka ............... H04N 5/783
375/E7.094
7,331,060 B1 2/2008 Ricciulli
(Continued)

OTHER PUBLICATIONS

Cowan et al., "StackGuard: Automatic Adaptive Detection and Prevention of Buffer-Overflow Attacks," Proceedings of the 7th USENIX Security Symposium, Jan. 1998, 17 pages.
(Continued)

*Primary Examiner* — Don G Zhao
(74) *Attorney, Agent, or Firm* — Jared C. Chaney

(57) ABSTRACT

A first computing system receives a user request. The user request includes a first set of data. The first computing system determines that one or more resources have exceeded at least one resource utilization threshold. In response to the determining that one or more resources have exceeded the at least one utilization threshold, a first data transfer rate is modified to a second data transfer rate based on transmitting a first subset of the first set of data to one or more host devices, wherein a second subset of the first set of data is not transmitted to the one or more host devices. The one or more host devices validate the user request against one or more security policies in order to complete or terminate the user request.

7 Claims, 9 Drawing Sheets

(51) Int. Cl.
G06F 9/54 (2006.01)
H04L 12/861 (2013.01)
H04L 29/08 (2006.01)

(52) U.S. Cl.
CPC ...... H04L 63/0227 (2013.01); H04L 63/0254 (2013.01); H04L 63/20 (2013.01); H04L 67/14 (2013.01); H04L 67/2804 (2013.01)

(58) Field of Classification Search
CPC .. H04L 63/0254; H04L 63/0227; G06F 9/542
See application file for complete search history.

(56) References Cited

U.S. PATENT DOCUMENTS

| | | | |
|---|---|---|---|
| 7,426,634 B2 | 9/2008 | Jain | |
| 7,694,338 B1 | 4/2010 | Jafari et al. | |
| 7,861,298 B1 | 12/2010 | Giallorenzi et al. | |
| 7,992,192 B2 | 8/2011 | Maher et al. | |
| 8,028,199 B1 | 9/2011 | Guruprasad et al. | |
| 8,505,091 B2 | 8/2013 | Greenlaw | |
| 8,806,629 B1* | 8/2014 | Cherepov | G06F 21/554 726/23 |
| 8,843,645 B2 | 9/2014 | Annamalaisami et al. | |
| 9,246,828 B1 | 1/2016 | Tagore | |
| 9,282,043 B1 | 3/2016 | Cao | |
| 9,807,104 B1* | 10/2017 | Sarra | H04L 63/1416 |
| 9,900,343 B1 | 2/2018 | Friedel | |
| 10,250,562 B1 | 4/2019 | Srinath et al. | |
| 2002/0031134 A1 | 3/2002 | Poletto et al. | |
| 2002/0066035 A1 | 5/2002 | Dapp | |
| 2002/0071424 A1* | 6/2002 | Chiu | H04M 1/2535 370/352 |
| 2002/0166063 A1 | 11/2002 | Lachman, III et al. | |
| 2002/0174335 A1* | 11/2002 | Zhang | H04L 63/0227 713/168 |
| 2003/0145232 A1 | 7/2003 | Poletto et al. | |
| 2004/0083259 A1* | 4/2004 | Tenembaum | G06Q 10/107 709/201 |
| 2004/0148504 A1* | 7/2004 | Forsberg | H04L 63/0823 713/168 |
| 2004/0236966 A1* | 11/2004 | D'Souza | H04L 29/06 726/13 |
| 2006/0053487 A1 | 3/2006 | Jeffries et al. | |
| 2006/0130140 A1* | 6/2006 | Andreev | H04L 63/1458 726/23 |
| 2007/0180533 A1* | 8/2007 | Ramaiah | H04L 45/54 726/26 |
| 2007/0186106 A1* | 8/2007 | Ting | H04L 63/0815 713/168 |
| 2008/0033954 A1* | 2/2008 | Brooks | G06F 21/33 |
| 2008/0062869 A1* | 3/2008 | Roos | H04L 29/06027 370/230 |
| 2008/0063005 A1* | 3/2008 | Roos | H04N 21/238 370/432 |
| 2008/0068993 A1* | 3/2008 | Roos | H04L 29/06027 370/230 |
| 2008/0178279 A1 | 7/2008 | Namburu et al. | |
| 2008/0186850 A1* | 8/2008 | Lee | H04L 27/02 370/232 |
| 2008/0235755 A1 | 9/2008 | Blaisdell et al. | |
| 2008/0279200 A1* | 11/2008 | Shatzkamer | H04L 63/0892 370/401 |
| 2008/0279362 A1 | 11/2008 | Yasrebi et al. | |
| 2009/0240737 A1* | 9/2009 | Hardisty | G06F 16/10 |
| 2010/0121970 A1* | 5/2010 | Roos | H04N 7/17318 709/231 |
| 2011/0066896 A1* | 3/2011 | Ebina | G06F 13/385 714/43 |
| 2011/0119761 A1 | 5/2011 | Wang et al. | |
| 2011/0138463 A1 | 6/2011 | Kim et al. | |
| 2011/0154473 A1 | 6/2011 | Anderson et al. | |
| 2011/0313981 A1* | 12/2011 | Ben-Natan | G06F 16/2455 707/694 |
| 2011/0320617 A1 | 12/2011 | Annamalaisami et al. | |
| 2013/0133068 A1 | 5/2013 | Jiang | |
| 2014/0115686 A1* | 4/2014 | Ivanov | H04L 29/06 726/11 |
| 2014/0283067 A1* | 9/2014 | Call | H04L 63/1425 726/23 |
| 2014/0297001 A1* | 10/2014 | Silverman | G05B 15/02 700/19 |
| 2014/0304798 A1* | 10/2014 | Iyengar | H04L 63/1458 726/11 |
| 2014/0344925 A1* | 11/2014 | Muthiah | H04L 61/1511 726/22 |
| 2015/0007314 A1 | 1/2015 | Vaughan | |
| 2015/0150123 A1 | 5/2015 | Be'ery et al. | |
| 2016/0050229 A1 | 2/2016 | Patel et al. | |
| 2016/0308901 A1 | 10/2016 | Jain | |
| 2017/0013008 A1* | 1/2017 | Carey | H04L 63/1433 |
| 2017/0041253 A1* | 2/2017 | Nishikawa | H04L 49/9031 |
| 2017/0041297 A1* | 2/2017 | Ling | H04L 63/20 |
| 2017/0123877 A1* | 5/2017 | Gongloor | G06F 11/3414 |
| 2017/0257348 A1 | 9/2017 | Jain et al. | |
| 2017/0302698 A1 | 10/2017 | Jain | |
| 2017/0310703 A1 | 10/2017 | Ackerman et al. | |
| 2018/0018465 A1* | 1/2018 | Carey | G06F 21/577 |
| 2018/0139228 A1 | 5/2018 | Kanakarajan et al. | |
| 2018/0255094 A1 | 9/2018 | Doron et al. | |
| 2018/0270156 A1* | 9/2018 | Keith | H04L 47/12 |
| 2018/0316714 A1 | 11/2018 | Gudov et al. | |
| 2018/0359141 A1* | 12/2018 | Valverde Garro | H04L 41/0686 |
| 2019/0020680 A1 | 1/2019 | Khalimonenko et al. | |

OTHER PUBLICATIONS

"IBM Security Guardium Data Activity Monitor," IBM Software Products, printed: Sep. 21, 2017, pp. 1-3. http://www-03.ibm.com/software/products/en/ibm-security-guardium-data-activity-monitor.
Lane, A., "The re-emergence of database denial-of-service attacks," DARKReading, Jun. 4, 2013, pp. 1-12. https://www.darkreading.com/application-security/database-security/dos-in-your-database/d/d-id/1139881.
"27 Managing Resources with Oracle Database Resource Manager," Database Administrator's Guide, Oracle Help Center, Online Documentation 12c, Release 1 (12.1), printed: Sep. 21, 2017, 78 pages. https://docs.oracle.com/database/121/ADMIN/dbrm.htm#ADMIN027.
Lane, A., "Dealing with Database Denial of Service," Report Version 1.0, Aug. 22, 2013, 15 pages, Securosis, LLC. https://securosis.com/assets/library/reports/Database_DoS.pdf.
"The DBMS must restrict the ability of users to launch Denial of Service (DoS) attacks against other information systems or networks," STIGViewer, printed: Sep. 21, 2017, 5 pages. https://www.stigviewer.com/stig/oracle_database_11.2g/2016-06-23/finding/V-52217.
Wiggins, L., "IBM Guardium Takes the Overall Leadership Position in the First Database Security Leadership Compass by KuppingerCole," SecurityIntelligence News, Apr. 18, 2017, pp. 1-6. https://securityintelligence.com/news/ibm-guardium-takes-the-overall-leadership-position-in-the-first-database-security-leadership-compass-by-kuppingercole/.
"Separation of duties," Wikipedia, the free encyclopedia, printed: Sep. 21, 2017, pp. 1-4. https://en.wikipedia.org/wiki/Separation_of_duties.
Rodniansky et al., "Service Overload Attack Protection Based on Selective Packet Transmission," U.S. Appl. No. 16/416,644, filed May 20, 2019.
List of IBM Patents or Patent Applications Treated as Related, Dated May 7, 2019, 2 pages.

* cited by examiner

SERVICE OVERLOAD ATTACK PROTECTION BASED ON SELECTIVE PACKET TRANSMISSION

BACKGROUND

This disclosure relates generally to computing systems that protect against security threats, and more specifically to protecting against service overload attacks, such as application layer Denial-of-Service (DoS) attacks.

Service overload attacks occur when one or more entities infiltrate or saturate one or more resources (e.g., memory, CPU) for the purpose making one or more sets of data associated with such resources unavailable to legitimate users. For example, in an application layer DoS attack, a first user may over-utilize a service feature (e.g., load up a virtual shopping cart with thousands of items and perpetually refreshing those carts). This over-utilization can cause various resource consumption problems, such as database lock-outs, crashes, processing delay, etc. Such over-utilization makes it difficult or impossible for genuine users to connect with or access particular data.

Another example of a service overload attack is the Distributed Denial-of-Service (DDoS) attack. A DDoS attack is similar to a DoS attack, except that a user device recruits various other user devices (i.e., a botnet) to each simultaneously infiltrate the target resource(s). Under this method, the user succeeds in making other users download malware, such as through phishing, and at a particular time the botnet sends each of their respective requests at the same time or at substantially the same time in order to flood the target resource(s). This causes the target system to slow down, crash, or shut down, thereby denying service to legitimate users.

SUMMARY

One or more embodiments are directed to a system, a computer program product, and a computer-implemented method. In some embodiments, the system comprises at least one computing device having one or more processors and at least one computer readable storage medium having program instructions embodied therewith. The program instructions are readable/executable by the one or more processors to cause the system to receive, at an Intercepting Server Agent (ISA) of a database server host, a user request. The user request includes one or more packets of data. The ISA intercepts the user request before the user request gets executed by the database server host. The ISA determines whether one or more buffers have exceeded an overflow threshold. In response to the determining that one or more buffers have exceeded the overflow threshold, a first subset of the one or more packets of data is extracted and transmitted to one or more External Security Mechanisms (ESMs). A second subset of the one or more packets of data is not transmitted to the one or more ESMs. The one or more ESMs being one or more host devices that are physically separate from the database server host. The one or more ESMs validate the user request against one or more security policies in order to complete or terminate the user request.

In some embodiments, the computer program product comprises a computer readable storage medium having program instructions embodied therewith. The program instructions are executable by one or more processors to cause the one or more processors to receive, at a first time, a first user request. The first user request includes a first set of data. The first set of data is transmitted to one or more host devices in a default mode. In the default mode, each entire set of data is transmitted. The one or more host devices validate the first user request against one or more security policies in order to complete or terminate the first user request. At a second time a second user request is received. The second user request includes a second set of data. The second time being subsequent to the first time. The one or more processors determine subsequent to the second user request that one or more resources have exceeded at least one resource utilization threshold. In response to the determining that one or more resources have exceeded the at least one utilization threshold, a switch is made from the default mode to an application layer Denial of Service (DoS) prevention mode. The DoS prevention mode includes a low traffic rate mode in which selected packets of the first set of data are transmitted to the one or more host devices, wherein a second subset of the first set of data is not transmitted.

In some embodiments, the computer-implemented method protects against application layer service overload attacks. A first computing system may receive a user request. The user request may include a first set of data. The first computing system may determine that one or more resources have exceeded at least one resource utilization threshold. In response to the determining that one or more resources have exceeded the at least one utilization threshold, a first data transfer rate may be modified to a second data transfer rate based on transmitting a first subset of the first set of data to one or more host devices. A second subset of the first set of data may not be transmitted to the one or more host devices. The one or more host devices may validate the user request against one or more security policies in order to complete or terminate the user request.

Figure 1:
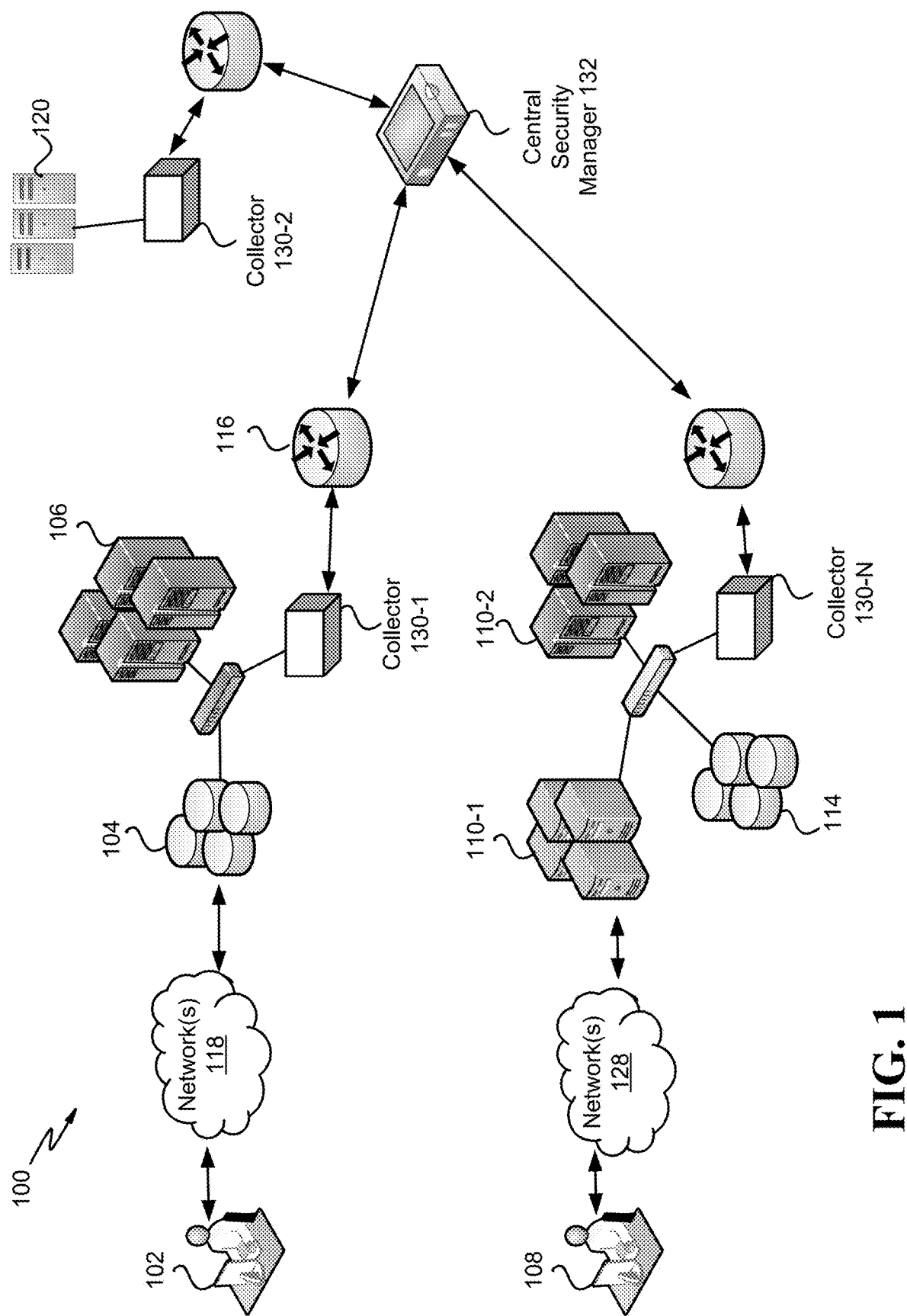
FIG. 1 is a schematic diagram of a computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to protecting against service overload attacks, such as application layer DoS attacks. While the present disclosure is not necessarily limited to such applications, various aspects of the disclosure may be appreciated through a discussion of various examples using this context.

There has been a recent uptick in DoS attacks against services such as banks, credit unions, and social media. To combat these attacks, networks have become more resilient to attacks and consequently, attackers are moving up to the application layer domain. A particular problem is that these application-level attacks may appear very similar to normal application requests. For example, an ill-intentioned user may perform normal user functions except that the user utilizes an abnormal quantity of resources, such as running a search in a website search field from hundreds of different sessions simultaneously. However, a legitimate user may also consume a large quantity of resources. Accordingly, differentiating between legitimate user requests and attack requests can be difficult to do.

Compounding matters is that current security computing systems may inadequately detect or handle service overload attacks. An "external" security system or mechanism as described herein is one or more host devices that are physically separate from a second computing system (e.g., a web application server). For example, an external security mechanism can be a distinct computing device, such as the computing device 12 of FIG. 8. These external systems can employ wired or wireless connections (e.g., a wide area network (WAN)) to the second computing system to provide a security check for a user request. For example, a contemporary way to protect sensitive information stored on databases is to use an External Database Security Mechanism (EDSM). A particular EDSM solution is GUARDIUM by IBM Corporation of Armonk N.Y. The GUARDIUM environment includes an EDSM, one or more database servers, and a lightweight intercepting server agent (ISA) module that is within each of the one or more database servers. The ISA intercepts network database and local database protocol packets exchanged between database client applications and database servers. For example, a user may desire to write a set of data to a first database within a database server. However, before executing the request on the first database server, the ISA intercepts the request and forwards the request to the EDSM host(s) for a security policy check. The EDSM either validates the request or detects a security threat (e.g., a SQL injection attack) and transmits a message to the ISA instructing the ISA to either terminate the request or finish executing the write request depending on the security check.

A particular challenge with GUARDIUM and other security computing systems is that there is no efficient way to handle service overload attacks. For example, by definition, ISA is a lightweight agent, meaning that it uses limited resources (e.g., 5% of CPU power) of the host database server in which it is employed on. This is to ensure that the end user has a seamless and uninterrupted experience for particular session(s). However, because the ISA and other security check applications are lightweight, their corresponding buffers become overloaded with information easily, especially when there is a service overload attack. And if the buffers are overloaded, packets get dropped, which causes network latency issues, memory errors, outages, etc. Therefore, embodiments of the present disclosure address some or each of these problems as described in more detail below.

FIG. 1 is a schematic diagram of a computing environment 100, according to embodiments. It is understood that although the computing environment 100 includes particular networks, computing devices, architectures, and configurations, embodiments of the present disclosure include more or less components than illustrated and can be implanted within any suitable computing environment.

The computing environment 100 includes at least two networks 118 and 128, each of which are communicatively coupled to a central security manager 133. Although the computing environment 100 includes two networks 118 and 128, it is understood that any suitable quantity of networks may exist. In some embodiments, the network(s) 118 and 128 are the same network (e.g., a public network or internet) such that each of the computing systems are communicatively coupled to one another. In particular embodiments, each of the network(s) 118 and 128 represent different sub-computing environments, such as a different geographical data center (Europe data center), a cloud environment, or a Hadoop environment. For example, the network(s) 118 can be a data center associated with a first geographical region, which includes database server(s) 104, one or more web application servers 105, and a collector 130-1. A "collector" is an external security system that collects and analyzes data within a respective computing environment. For example, the collector 130-1 collects real-time data from databases within the database server(s) 104 and compares the data to previously defined security policies to detect any violations associated with the user request by the device 102. Upon a violation detection, the collectors respond with a variety of policy-based actions, such as generating an alert or instructing a system to block a transaction in real-time.

After the data is analyzed by the collectors (130-1, 130-2, and 130-N), it is then routed (e.g., via the router 116) to a distinct network that includes the central security manager 132. The central security manager 132 is an external system that aggregates all of the data from each of the collectors 130-1, 130-2, and 130-N and compares each of the data against enterprise-wide policies, alerts, queries and reports. This allows the central security manager 132 to assess data regardless of how geographically distant or distinct each computing environment is from each other. The central security manager 132 can perform various other tasks such as install patches, provide holistic logical views of all of the data from all of the networks, generate enterprise-level reports, push configuration and perform a variety of other administrative tasks on each of the networks from a single console. In an example illustration of an enterprise-wide policy, the network(s) 118 can fail (e.g., network latency has decreased outside of a threshold). Accordingly, the central security manager 132 in embodiments cause probes within the database server(s) 104 to automatically fail over to the collector 130-N to provide high availability and load balancing for the user device's 102 request.

In some embodiments, the mainframes 120 are a part of a different network than the network(s) 118 and the network(s) 128. In this example, the collector 130-2 collects and analyzes security information directly from the mainframes 120 and transmits the data to the central security manager 132.

The user device(s) 102, 108 establish a connection or communicates with the rest of the environment via the network(s) 118 and/or 128. These networks are or includes any suitable network such as a local area network (LAN), a general wide area network (WAN), a personal area network (PAN), and/or a public network (e.g., the internet).

In an example illustration of how a particular transaction may be analyzed, a user first issues a request from the user device 108. The network(s) 128 can be associated with a Hadoop environment. Accordingly, for example, the request is issued to one of the distributed clusters 110-1, 110-2. Although FIG. 1 depicts 2 distributed clusters 110-1 and 110-2, any quantity of clusters can be present. The request specifies to strip data across one or more volumes of the distributed storage system 114. One or more probes (e.g., an ISA) intercepts the request and monitors each database transaction at the operating system kernel level within the storage system 114. The probes then forward the transaction data to the collector 130-N. The collector 130-N determines whether the request violates one or more local or enterprise-level security policies (e.g., whether a DoS attack has been detected) and transmits a message to one of the clusters 110 instructing it to either finish processing the user request or terminate the request associated with the user device 108. The collector 130-N then transmits a message to the central security manager 132 indicating that the particular user request(s) was terminated and querying for any potential enterprise-level policies that should be implemented based on the DoS attack detection.

Figure 2:
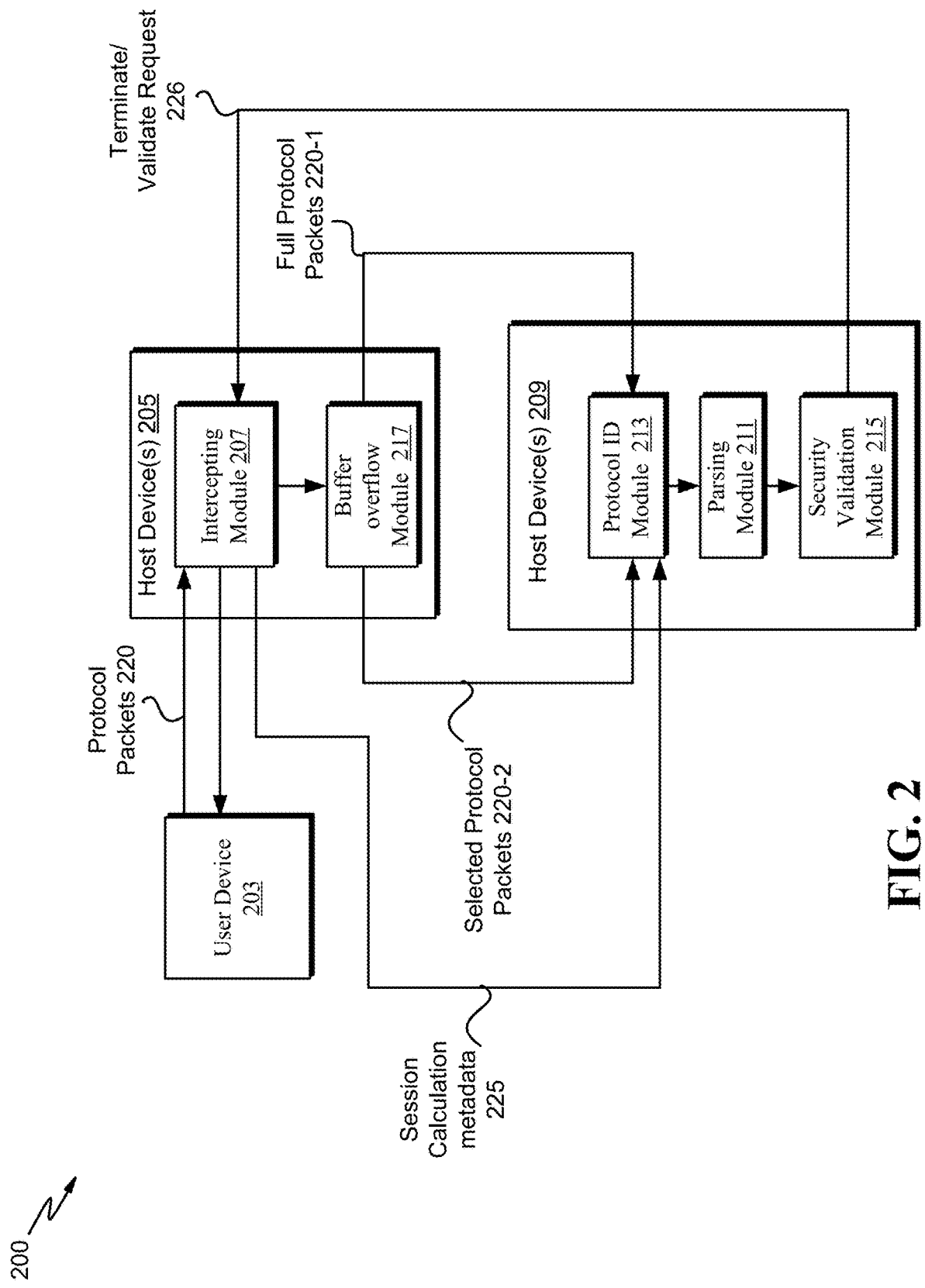
FIG. 2 is a block diagram of a computing environment illustrating how multiple host devices handle a service overload attack, according to embodiments.

FIG. 2 is a block diagram of a computing environment 200 illustrating how multiple host devices handle a service overload attack, according to embodiments. The computing environment 200 includes a user device 203 (e.g., the user device 102 of FIG. 1, mobile phone, laptop, etc.), the host device(s) 205 (e.g., the database server 104 of FIG. 1), and the host device(s) 209 (e.g., the collector 130-1 of FIG. 1).

The user device 203 issues a request, which includes the protocol packets 220 (e.g., database session protocol packets). The protocol packets include a set of data as part of a user request (e.g., a read and/or write request). For example, the protocol packets 220 in some embodiments include one or more headers, a payload of data, and a footer of data according to the TCP/IP protocol.

The host device(s) 205 receive the protocol packets 220 from the user device 203. Before a request associated with the protocol packets 220 is executed, the intercepting module 207 (e.g., an ISA or probe) intercepts the request and forwards the request to the buffer overflow module 217. The buffer overflow module 217 determines whether one or more buffers have exceeded a buffer storage or utilization threshold. For example in some embodiments a buffer has a storage capacity of X quantity of storage space, which may be the threshold. Accordingly, if the request causes the buffer to reach its storage capacity or other utilization threshold, selected protocol packets 220-2 are extracted and transmitted to the host device(s) 209.

In some embodiments, the selected protocol packets 220-2 includes only necessary packet information for the host device(s) 209 to perform a security check, such as user ID information (e.g., user device 203 IP address). For example, a payload (e.g., file data in a write request) and various other footer information within a packet can be deleted from a buffer so that the buffer does not reach its capacity threshold. In this situation, other important information is extracted from the packet, such as the user ID information, and transmitted as the selected protocol packets 220-2. In some embodiments, the payload and other information is not deleted but transferred to another data store (e.g., RAM, cache, disk, etc.) to free up the buffer capacity and so that the payload and other information can be reassembled with the rest of the packet for future processing. For example, if it is determined that the packet does not violate a security policy, the packet can be reassembled with its payload and footer information and the request can continue to be executed.

In some embodiments, if the buffer exceeds the utilization threshold, then session metadata associated with the user request is calculated and transmitted 225 to the host device(s) 209. For example, calculations such as packet rate, database server response time rate (PDR), and/or data volume can be performed on the protocol packets 220. As described in more detail below, this information can help determine whether the request violates any security policies.

If the buffer does not reach the utilization threshold, then all of the information in the packet (i.e., the full protocol packets 220-1) is transmitted to the host device(s) 209. For example, if the buffer does not reach storage capacity upon receiving the request, in embodiments it stores the entire packet of data—e.g., header, payload, and footer—to the buffer and transmits it to the host device(s) 209.

When the host device(s) 209 (e.g., an EDSM) receives either the selected protocol packets 220-2 or the full protocol packets 220-1, it first identifies the protocol associated with the packets (e.g., identifying whether the packets are TCP/IP, UDP, Distributed Relational Database Architecture (DRDA) protocol database protocol packets, etc.) via the protocol ID module 213. Based on this identification, the parsing module 213 parses the data. For example, in some embodiments the parsing module 213 identifies user ID information in a TCP/IP header and parses the queries in the payload up to the database objects level to determine particular transaction requests (e.g., read, write, insert, delete).

The security validation module 215 checks a set of security policies against the user request. And based on the security check, the security validation module 215 transmits either a "terminate" or "validate" request 226 back to the intercepting module 207 in order to instruct the host device(s) 205 to finish executing or terminate the request from the user device 203. For example, the security policies can include various conditional statements coupled with integer values that if violated, trigger a response. In an example illustration, a conditional statement can detail that if two or more sessions within a particular quantity of time (e.g., 1 minute) were initiated by the same user device 203 and/or if the session included a particular quantity of payload data, the session should be terminated. This security policy can guard against service overload attacks.

It is understood that the security policies are not limited to service overload attacks, but can specify various other security policies. For example, the security policies or modules associated with the security policies can prevent cyber-attacks, block unauthorized access to sensitive data, quarantine suspicious users, mask sensitive data, control firewall IDS, assess and identify vulnerabilities, encrypt a particular set of data, provide patching, real-time analytics, auditing and reporting, etc.

Figure 3A:
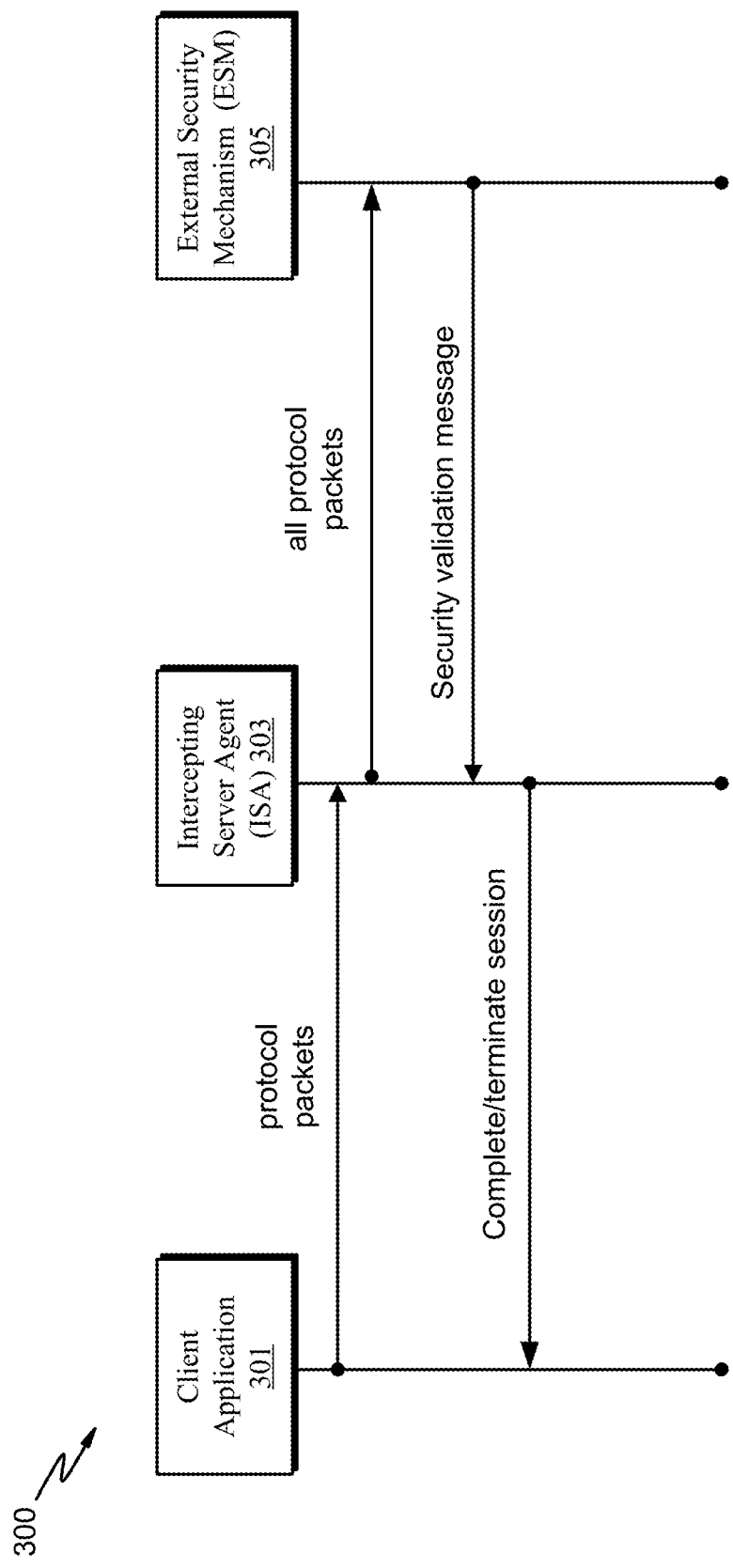
FIG. 3A is a sequence diagram illustrating communication between entities when one or more resources have not exceeded a utilization threshold, according to embodiments.

FIG. 3A is a sequence diagram 300 illustrating communication between entities when a resource utilization has not exceeded a threshold, according to embodiments. In some embodiments, as illustrated by the sequence diagram 300, communication occurs between a client application 301 (e.g., a browser application on the user device 203), an ISA agent 303 (e.g., the intercepting module 207 and/or buffer overflow module 217), and an External Security Mechanism (ESM) (e.g., the host device(s) 209).

The client application 301 first transmits a request that includes protocol packets to the ISA 303. The ISA determines that no resource (e.g., a buffer, CPU, and/or network latency) has exceeded a utilization threshold. In response to this determination, the ISA 303 transmits all of the protocol packets to the ESM 305. The ESM 305 then determines whether the packets violate one or more security policies and responsively transmits a security validation message to the ISA 303 instructing the ISA to either finish executing the request or terminate the request. The ISA 303 may either complete the request by the client application 301 (e.g., fetch a row of data from a database and transmit the row back to the client application 301) or terminate the session(s) associated with the client application 301 request. It is to be understood that while there are specific components that perform these steps (e.g., the ISA 303, ESM 305), any suitable component as described above can perform them, such as the host device(s) 205 and/or 209 of FIG. 2.

Figure 3B:
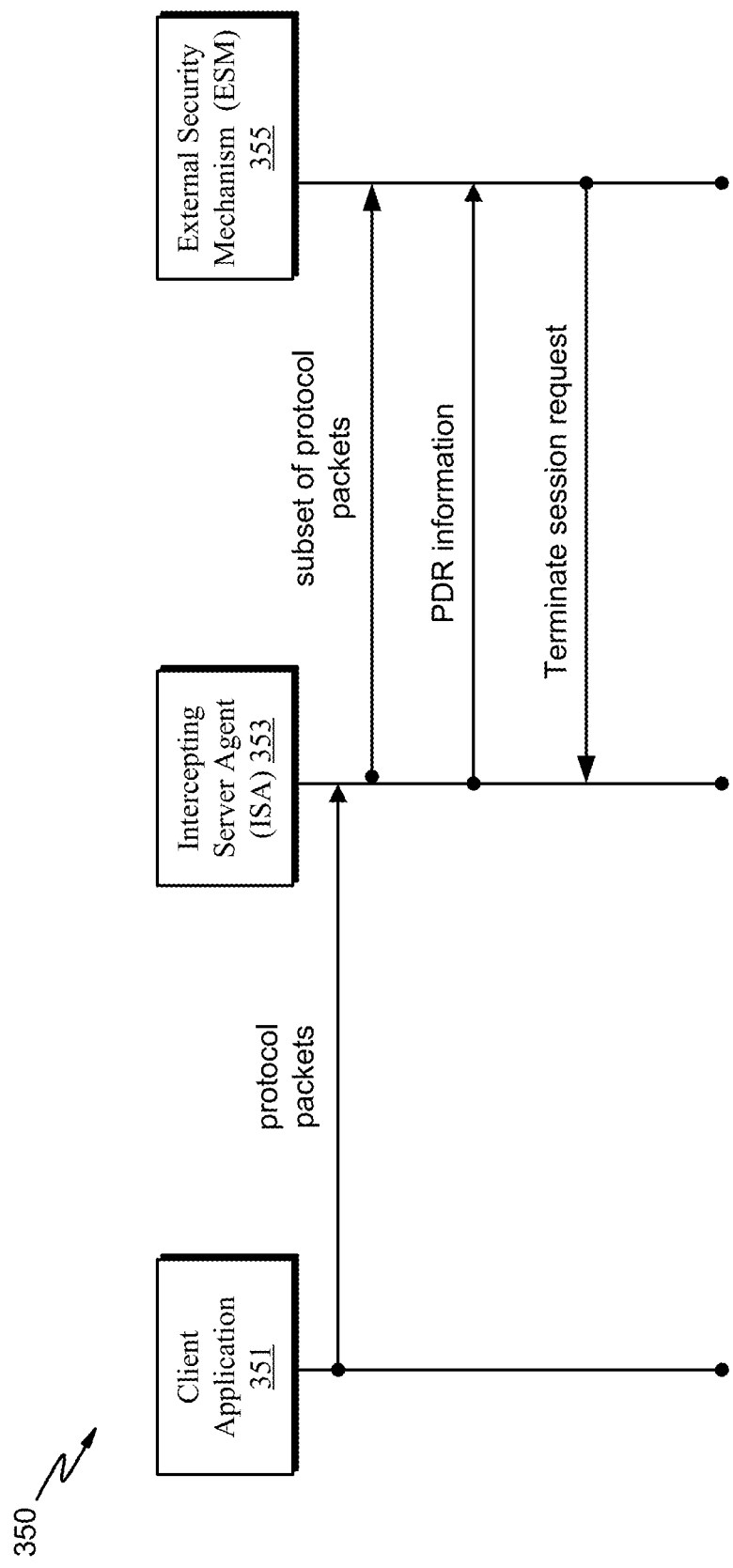
FIG. 3B is a sequence diagram illustrating communication between entities when one or more resources have not exceeded a utilization threshold, according to embodiments.

FIG. 3B is a sequence diagram 350 illustrating communication between entities when a resource utilization has exceeded a threshold, according to embodiments. The sequence diagram 353 includes the client application 351, the ISA 353, and the ESM 355.

The client application 351 first transmits a request that includes protocol packets to the ISA 403. The ISA determines that a particular resource or set of resources (e.g., a buffer, CPU, and/or network latency) has exceeded a utilization threshold. In response to this determination, the ISA 353 extracts and transmits a subset (e.g., user ID information) of the protocol packets to the ESM 355. In some embodiments, the subset of the packet data is the selected protocol packets 220-2 of FIG. 2. The ISA 353 also transmits PDR information and/or other session metadata information associated with the protocol packets. The ESM 355 determines whether the subset of packets and/or the PDR information violate one or more security policies. If the information violates one or more security policies, a terminate session request is transmitted from the ESM 355 to the ISA 353, which instructs the ISA 353 to terminate the user request. It is to be understood that while there are specific components that perform these steps (e.g., the ISA 353, ESM 355), any suitable component as described above can perform them, such as the host device(s) 205 and/or 209 of FIG. 2.

Figure 4:
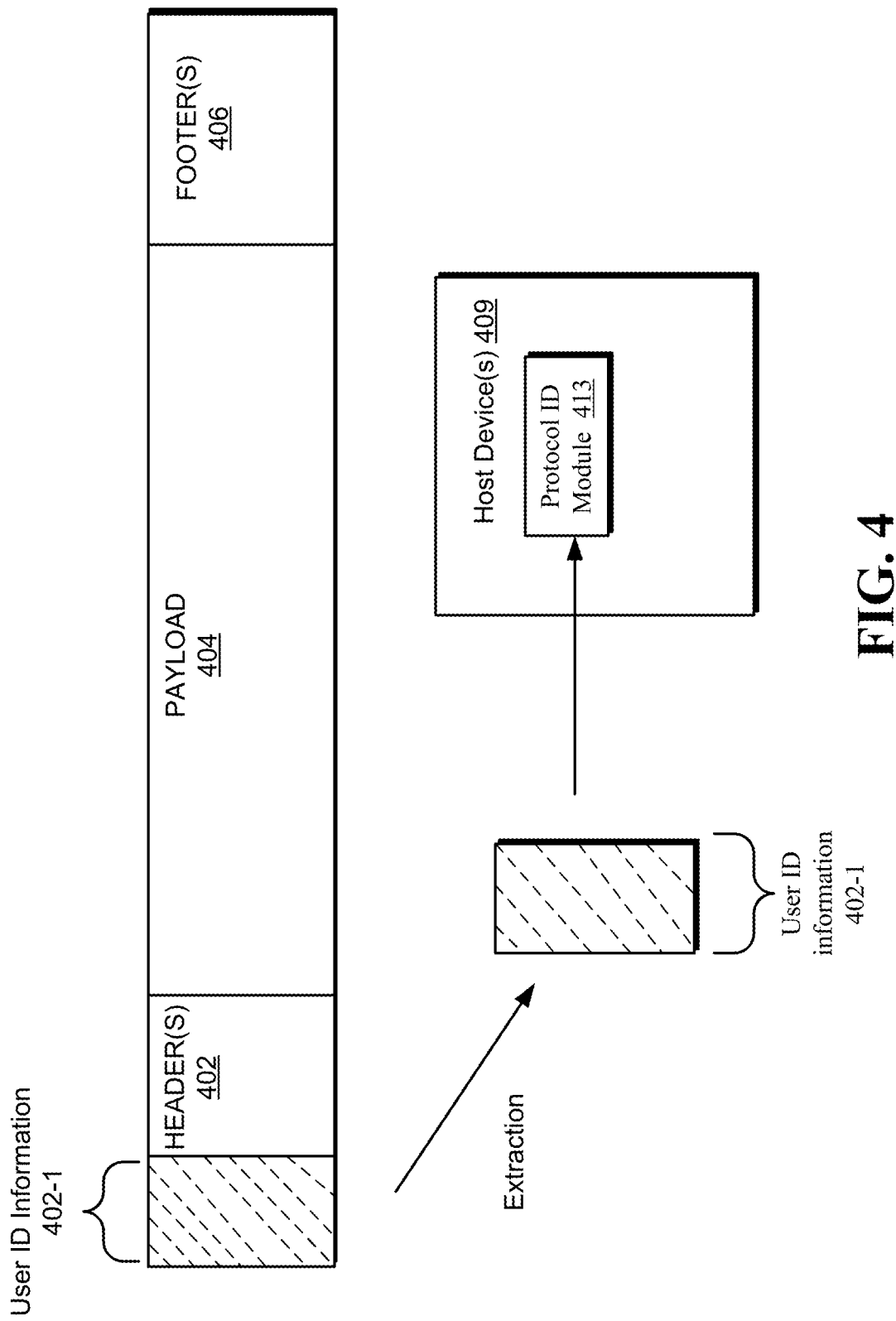
FIG. 4 is a schematic diagram illustrating a unit of data and how a subset of data is extracted from the unit in order to protect against service overload attacks, according to embodiments.

FIG. 4 is a schematic diagram illustrating a unit of data and how a subset of data is extracted from the unit in order to protect against service overload attacks, according to embodiments. The unit of data includes one or more headers 402, a payload of data 404 and one or more footers 406. The unit of data can be or include one or more packets, frames, segments, data grams, and/or bits.

Upon determining that one or more resources have exceeded one or more resource utilization thresholds (e.g., a buffer capacity overflow), the user ID information 402-1 is extracted from the header(s) 402 (e.g., by the probes described in FIG. 1) and transmitted to the host device(s) 409 (e.g., the collector 130-N of FIG. 1) to be presented at the protocol ID module 413. In some embodiments, the user ID information 402-1 includes a source user device IP address that transmitted the packet, a source application ID performing the request, a time-stamp indicating when the request was transmitted/received, the size of the payload in the request, and/or a database name or other logical object the request is trying to access (e.g., a particular set of rows on a particular table). In some embodiments, instead of or in addition to transmitting the user ID information 402-1, other information is extracted and transmitted such as other header information, particular sets of payload data, and/or footer information.

In particular embodiments, the data unit indicated in FIG. 4 is any suitable unit according to any suitable protocols, such as TCP/IP, UDP, Distributed Relational Database Architecture (DRDA) protocol, Tabular Data Stream packet (TD), etc. For example, in some embodiments according to a the IP protocol, the header(s) 402 includes IP header length, total length of entire unit of data in bytes, an ID of the data unit to piece elements back together, flags indicating whether the data unit can be fragmented, fragment offsets indicating where fragments should be placed, time-to-live (TTL) bits indicating how long the data unit should be allowed to exist in the network, checksums to prevent corruption of the header. In embodiments, the header(s) 402 is or include TCP header information such as other checksums, flags (e.g., SYN, ACK, FIN) associated with communication establishment, source/destination port bits, offsets, etc. The payload 404 includes actual request or application data (e.g., document file, database query, image file data, etc.). The footer(s) 406 includes a set of bits indicating that the end of the data unit has been reached.

In an example illustration of how the user ID information 402-1 is extracted, a system such as the host device(s) 205 of FIG. 2 receives the protocol packets 220 at the intercepting module 207. The intercepting module 207 then determines that a resource utilization threshold has been reached. It then reads the flag bits in the IP header indicating that the data unit can be fragmented. It can then extract the user ID information 402-1 from the header and temporarily place the rest of the data unit (i.e., the rest of the header(s) 402, payload 404, and footer 406) in a separate data store (e.g., another buffer, RAM, disk, etc.). The user ID information 402-1 is then be transmitted to the host device(s) 209, which determine whether the user ID information violates one or more policies. If there is no violation, the host device(s) 209 transmits a message to the intercepting module 207. Responsively, the intercepting module 207 can then reassemble the user ID information 402-1 back with the unit of data stored to a different data store. Accordingly, the intercepting module 207 can first match the ID of the user ID information 402 with the rest of the data unit, which also has a matching ID value. The intercepting module 207 then uses the fragment offsets in order to place the user ID information 402-1 back within the header(s) 402. The entire data unit can then be assembled with other incoming packets and transmitted from the additional data store to the host device(s) 209 and/or the client application target to complete the request (e.g., transmitting a file to another end user host).

Figure 5:
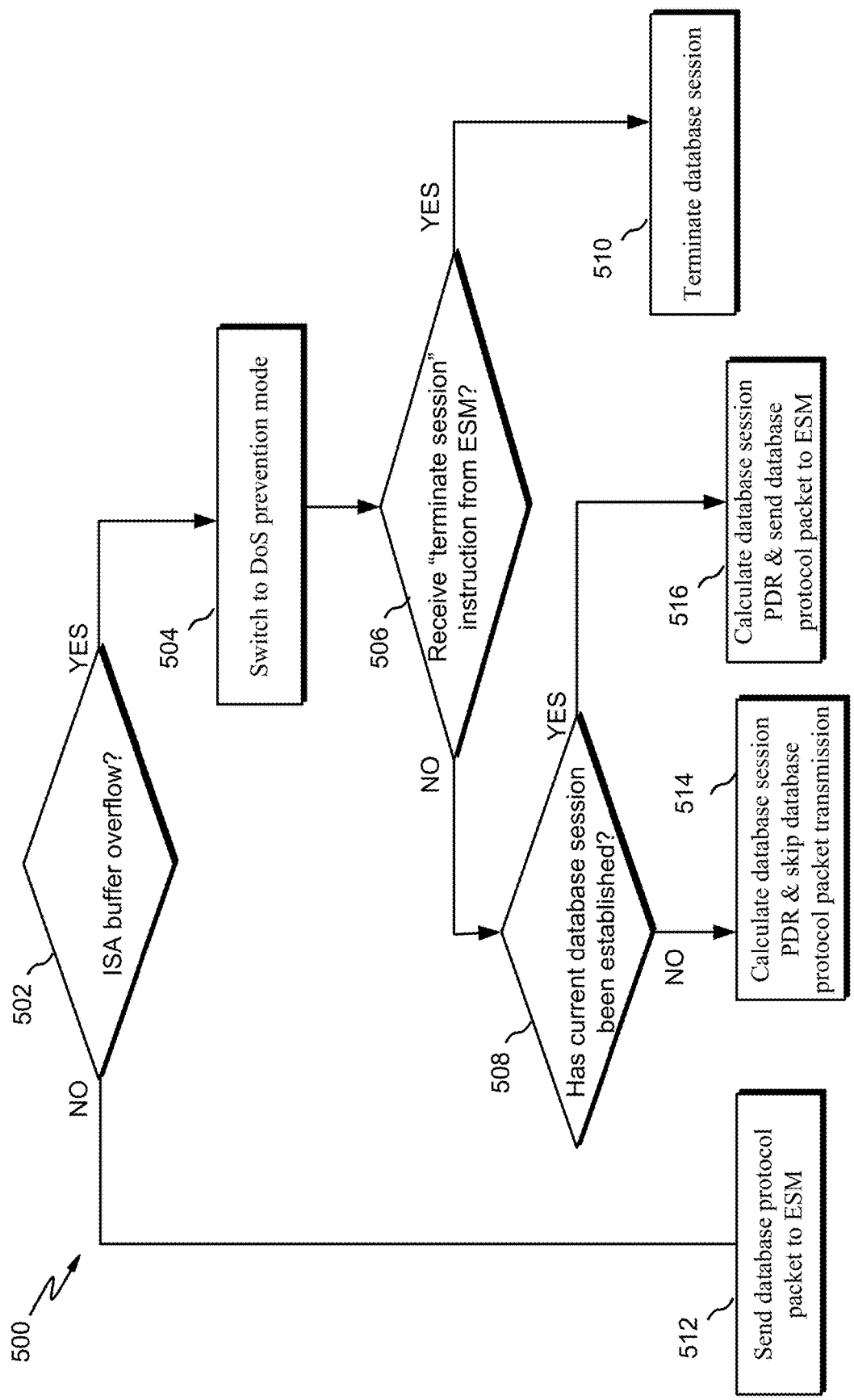
FIG. 5 is a flow diagram of an example process for processing data in a DoS prevention mode upon detecting an ISA buffer overflow event, according to embodiments.

FIG. 5 is a flow diagram of an example process 500 for processing data in a DoS prevention mode upon detecting an ISA buffer overflow event, according to embodiments. The process 500 (as well as any other processes disclosed herein, e.g., 600, 700) can be performed by processing logic that comprises hardware (e.g., circuitry, dedicated logic, programmable logic, microcode, etc.), software (e.g., instructions run on a processor to perform hardware simulation), firmware, or a combination thereof.

At block 502, it is determined (e.g., by the buffer overflow module 217) whether there is an ISA buffer overflow. For example, a user may intend to over saturate compute resources and its requests may include an enormous quantity of data, which causes the ISA buffer to exceed a threshold or its storage capacity.

Per block 512, if there is no ISA buffer overflow at block 502, the entire database protocol packet (e.g., entire data unit of FIG. 4) is transmitted to an ESM (e.g., the host device(s) 209 of FIG. 2). The ESM can then perform a separate security check on the data, such as whether the user is authorized to access a particular set of data, whether the request is a cyber attack (e.g., an SQL injection), etc.

Per block 504, if there is an ISA buffer overflow at block 502, then the ISA switches to DoS prevention mode. In some embodiments, the DoS prevention mode includes modifying a data transfer load and/or rate when transmitting to the ESM in order to free up resources, such as network latency, memory, CPU processing, etc. For example, the data transfer rate to an ESM can speed up because only the user ID information (e.g., user ID information 402-1) or other information is extracted and transmitted to the ESM as opposed to transmitting the payload of data. This can also cause the ESM to process information at a much faster rate since it does not have to process the entire load of data, such as a payload. Therefore, the ESM can perform security checks at a much faster rate. The DoS prevention mode is thus a low traffic mode that effectively allows less important database protocol packets to be skipped or transmitted to the ESM in order to give ESM sufficient information revealing attacker sessions in a timely manner.

In an example illustration of switching to a DoS prevention mode at block 504, at a first time, a host device receives a first user request and it is determined that the ISA buffer overflow has not exceeded a threshold. In response, an entire unit or packet of data is transmitted to the ESM (e.g., block 512). The entire transmission of packets is considered the "normal" or "default" mode of the system. However, at a second time, the host may receive a second request, which causes the ISA buffer overflow to exceed a threshold and in response, the "DoS prevention mode" is turned on such that data (e.g., user identification data) is extracted from the packets and transmitted to the ESM. In some embodiments, the DoS prevention mode is a low traffic rate mode in which selected packets are sent to one or more host devices (e.g., ESM) for security processing.

In some embodiments, the DoS prevention mode is implemented using a "while" programming statement such that each user request or each session associated with a particular user device is monitored for security threats. For example, the while statement can specify that while the buffer is exceeding a threshold, user ID information is extracted and session metadata (e.g., packet rate, PDR, etc.) is calculated and transmitted to the ESM. This allows the ESM to determine important information such as how often a user device is making a request (e.g., via IP address and timestamp information) and the size of the payload. For example, if the user is making 100 requests per 5 minutes and each payload is extremely large, the ESM can determine that any request associated with the user is terminated.

Per block 506, it is determined whether the ISA received a "terminate session" instruction from the ESM. Per block 510, if the ISA received the "terminate session" instruction, the ISA terminates the database session of the user request. In some embodiments, the ISA is configured to terminate each user session owned by the same user device if the first session was terminated in case a user tries to engage in several sessions to consume resources.

Per block 508, if the ISA does not receive a "terminate session" instruction from the ESM, it is determined whether the current database session has been established. For example, it can be determined whether there is been a SYN, ACK and FIN communication between the user device and server(s) (e.g., an HTTP session) such that the user is able to view a website and access its resources. In some embodiments, a session ends when a communication connection between two or more computing systems (e.g., the user device 203 and the host device(s) 205) is terminated and is established and maintained when there is a communication connection.

A user may engage in application-level DOS attacks by engaging in several sessions. For example, the user may open up several browsers or several windows/tabs within a browser and simultaneously issue dozens if not hundreds of requests from these different windows, creating multiple sessions. What makes these attacks even more problematic is with resources such as virtual machines (VM), which may allow an attacker to not only open several windows on a host machine, but he/she may open up a guest VM, open up several windows on the VM, and transmit several request from the VM at the same time as the host machine. Accordingly, embodiments of the present disclosure are configured to handle these massive quantity of requests, as these requests can quickly cause a buffer or other resource to reach a capacity threshold, thereby triggering the actions described herein (e.g., the processes 500 and/or 600).

Per block 514, if the current database session has not been established, then various database protocols can be skipped in transmission (e.g., the selected protocol packets 220-2, via extracting the user ID information 420-1) to the ESM. Session PDR and other session metadata is also calculated and transmitted to the ESM. Per block 516, if the current database session has been established, then the entire database packet can be transmitted to the ESM (e.g., the full protocol packets 220-1). Session PDR and other session metadata is also calculated and transmitted to the ESM. It is understood that although the process 500 details functions of an ISA, ESM, and a DoS attack, any other module or security system can be responsible for carrying out the process 500 in response to any type of service overload attack, not just DoS attacks.

Figure 6:
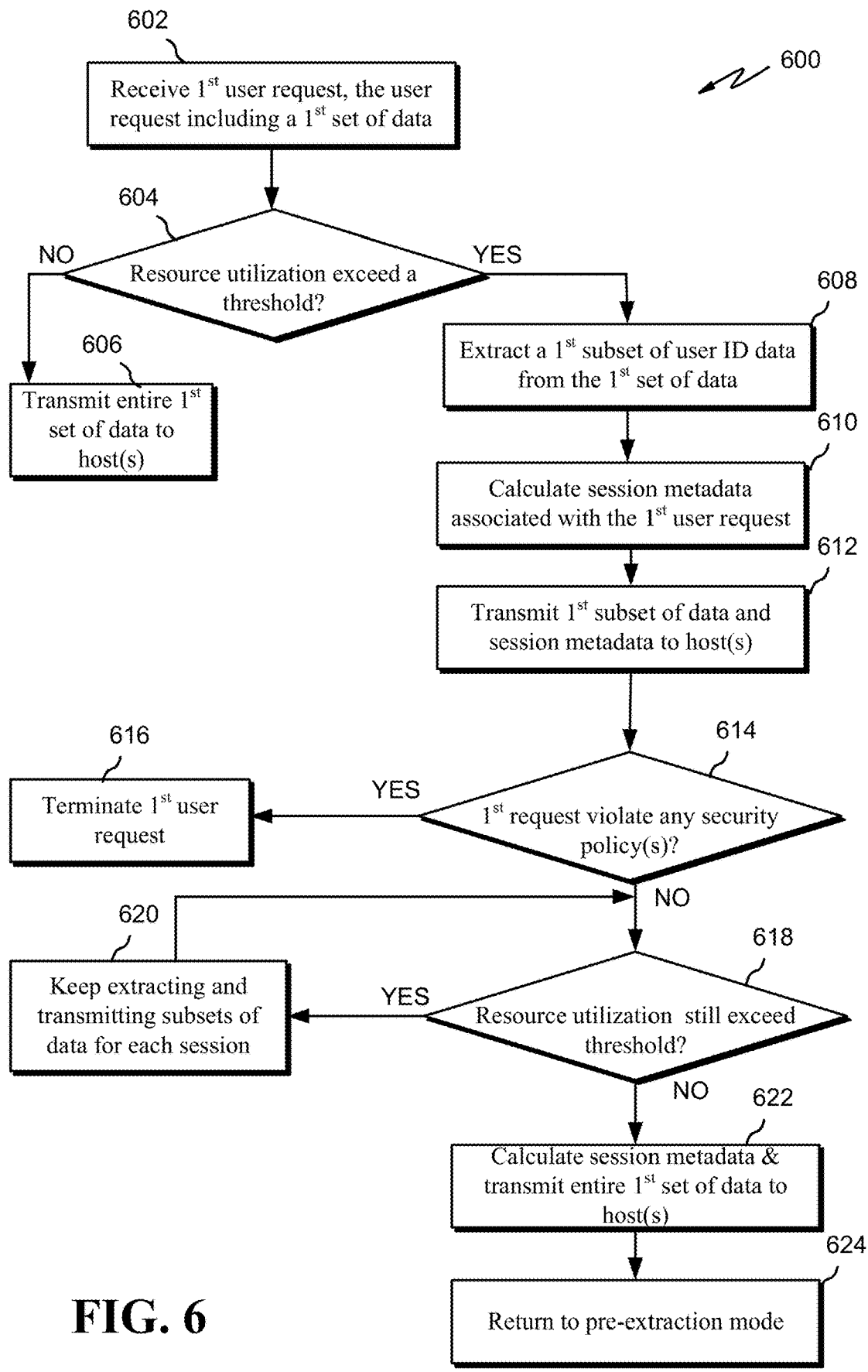
FIG. 6 is a flow diagram of an example process for handling a request when one or more resources have been utilized above a threshold, according to embodiments

FIG. 6 is a flow diagram of an example process 600 for handling a request when one or more resources have been utilized above a threshold, according to embodiments. Per block 602 a first user request is received at a first (e.g., the host device(s) 205 of FIG. 2). The user request includes a first set of data (e.g., a database protocol unit of data).

Per block 604, it is determined (e.g., by the buffer overflow module 202) whether one or more resources have exceeded at least one resource utilization threshold. The "resources" in some embodiments are or includes one or more data stores (e.g., one or more buffers, volatile memory, non-volatile memory, disks, cache, etc.), processors, compute nodes, browsers, modules (e.g., database engine), etc. The "resource utilization threshold" is a threshold value (e.g., an integer value) corresponding to the resource capacity or other threshold value of the resource being utilized that indicates the resource is being consumed at a particular level. In an example illustration, a buffer or other storage device can temporarily store several requests and when it reaches its storage capacity, its resource utilization threshold is exceeded. In another example, an SQL server or other host device may only have the capacity process a certain quantity of application worker threads (e.g., CPU threads) or processes at once, and when that quantity is exceeded, the resource utilization threshold is also exceeded.

Per block 606, if the resource utilization has not exceeded a threshold, the entire first set of data is transmitted to the one or more host devices. For example referring back to FIG. 4, the entire data unit, which includes the header(s) 402, the payload 404, and the footer 406 is transmitted to the host device(s) 409.

Per block 608, if the resource utilization exceeds a threshold, then a first subset of user ID data (e.g., the user ID information 402-1) is extracted (e.g., by the buffer overflow module 217) from the first set of data. In this situation, a second subset of data (e.g., the payload 404 and the footer 406) is not extracted. Per block 610, session metadata associated with the first user request or session is calculated (e.g., by the buffer overflow module 217). The session metadata is or includes any suitable metadata, such as PDR, packet rate, data volume rate, data volume, and time stamp information. In some embodiments, the PDR is calculated by a quantity of packets received per period of time. In some embodiments, the packet rate is calculated as a quantity of data received over a quantity of time, such as bytes received per second. In some embodiments, the data volume is a quantity of data (e.g., in bytes, gigabytes, megabytes, etc.) that each data unit (e.g., a packet) or sub-unit (e.g., a payload of the packet) contains. A data volume rat is the quantity of data received per period of time. A "time stamp" is the time gap between receiving request to service and sending response from the service. In some embodiments, a "time stamp" is the time at which one or more host devices receives or sends data or both. In some embodiments, similar calculations, such as session delay is calculated by the time it takes to create a session. In an example illustration, session delay can be calculated in a TCP environment by the time between a point when a host device receives a SYN (synchronize sequence number) request from a client and when the host device receives an ACK (acknowledge) back from the client. In some embodiments, execution delay is calculated, which is the time it takes between receiving a user request (e.g., an SQL query request) and executing the user request (e.g., fetching a database record).

Per block 612, the first subset of data and the session metadata are transmitted to the one or more host devices (e.g., the host device(s) 209). In this situation, the second subset (e.g., a payload) of the first set of data is not transmitted to the one or more host devices. The one or more host devices validate the user request against one or more security policies in order to complete or terminate the user request.

In some embodiments, the session metadata and the first subset of data are transmitted in the same data unit package to the host device(s). In some embodiments, they are sent separately at different times. For example, in embodiments, at a first time a first host device transmits the first subset of data and waits for an instructions from a second host device to terminate or complete the transaction. After such instruction, the first host device can then transmit session metadata regarding the session just terminated and/or other requests or sessions. Conversely, at a first time, a first host device can send the first subset of data and session metadata to a second host in the same packet of data.

Per block 614, it is determined or identified (e.g., by the host device(s) 205 and/or 209) whether the first user request violates any security policies. For example, after a first host device transmits the first subset of data and session metadata to a second host, the second host can then determine, based on the first subset of data and/or the session metadata, that the first user request violates one or more security policies. The second host device then sends and the first host device receives a notification indicating that the first set of data violates one or more security policies.

Per block 616, if the first request violates one or more security policies, the first user request is terminated. For example using the illustration above, the first host device can terminate the current session or each session associated with the first user request after it receives a termination instruction from the second host device. In some embodiments, a single host device determines whether the first request violates a security policy without transmitting the request to another host device (e.g., an ESM) or receiving a validate/terminate instruction from the host device.

Per block 618, if the first user request does not violate any security policies, it is determined at a second time whether the resource utilization still exceeds one or more thresholds. Per block 620, if the one or more resources still exceed one or more resource utilization thresholds, then subsets of data are still extracted and transmitted to host devices for each session (e.g., the DoS prevention mode is maintained). For example, an attacker may have issued various simultaneous or substantially simultaneous requests (e.g., 1 every 2 seconds) associated with various sessions on multiple windows of a browser. The first request may include a large payload of data and may cause a buffer to exceed a resource utilization threshold. But while a host device processes the first request, a second request may have arrived that also causes the buffer to exceed a threshold. Accordingly, even when the first request is terminated, a second request can be overloading the system. Accordingly, embodiments are designed to handle multiple session requests in parallel by extracting and transmitting subsets of data to host devices while the resource(s) have exceeded a resource utilization threshold. In some embodiments, this is referred to herein as the "DoS prevention mode," which is a mode that is configured to handle multiple parallel sessions/requests when one or more resources are exceeding a utilization threshold, such as by extracting subsets of data and transmitting them to a security host to be processed.

Per block 622, if the resource utilization no longer exceeds a threshold, session meta data is calculated and the entire first set of data is transmitted back to a host device (e.g., the host device(s) 205). Per block 624, the system then returns back to the pre-extraction or default mode. For example, the system may be in the "DoS prevention mode" where every data unit is extracted and transmitted and session metadata is calculated (e.g., block 608-612) and at block 624, the system no longer strips or extracts data units and session metadata is no longer calculated. In some embodiments, returning to the pre-extraction mode affects data transfer rate and thus includes modifying, in response to terminating one or more sessions, a second data transfer rate back to the first data transfer rate. For example, when the first subset of data is extracted and transmitted to the one or more host devices, the data transfer rate can speed up since less data is being transmitted and processed. However, when the data is not extracted because the system returns to the pre-extraction mode, the data transfer rate can slow down back to the original data transfer rate before the detecting that a resource(s) exceeded a resource utilization threshold. The slowing can occur because the payload of data, as well as other header or footer information must now be transmitted and processed.

Figure 7:
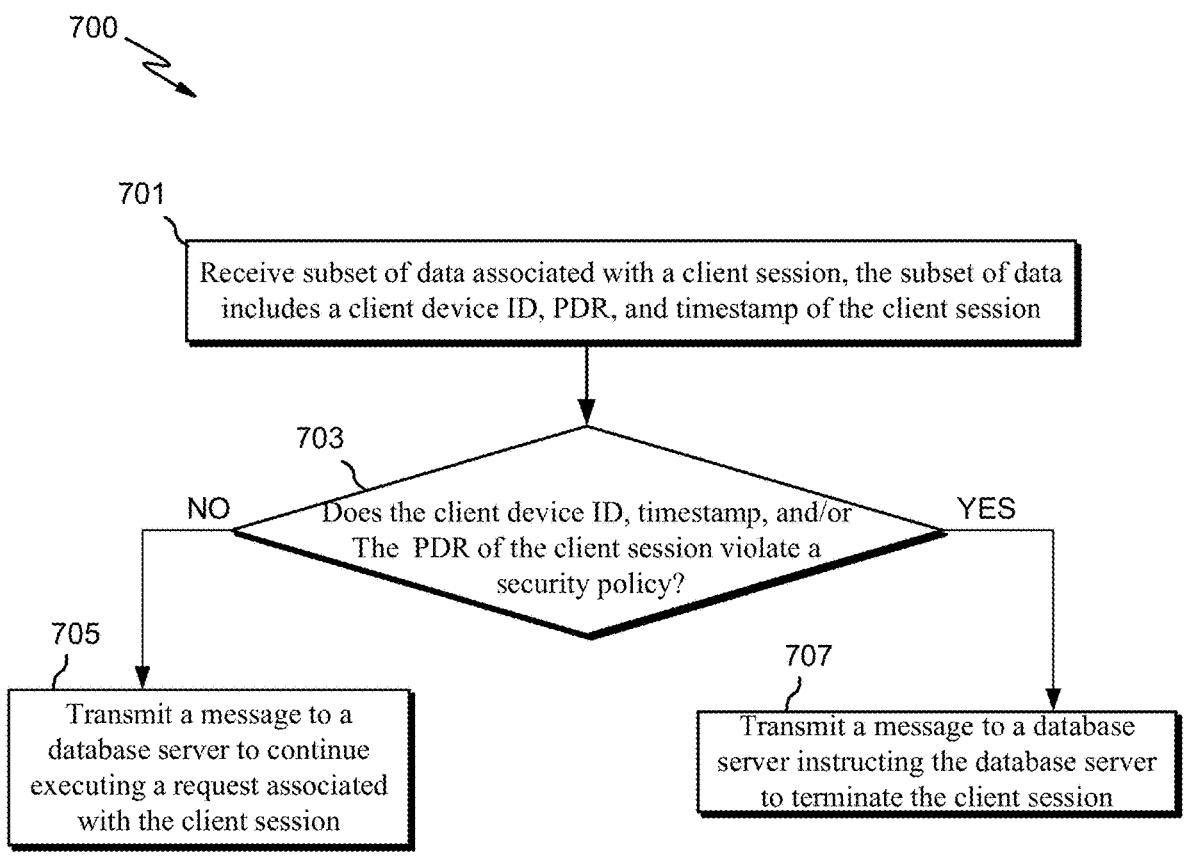
FIG. 7 is a flow diagram of an example process for determining whether a set of data violates one or more security policies, according to embodiments.

FIG. 7 is a flow diagram of an example process 700 for determining whether a set of data violates one or more security policies, according to embodiments. Per block 701 a subset of data associated with a client session is received (e.g., by the host device(s) 209). In some embodiments, FIG. 7 represents functions processed by one of the collectors 130 of FIG. 1, an external security system host, and/or block 614 of FIG. 6. Accordingly, after a first host device intercepts a user request, extracts and transmits a subset of data (e.g., the selected protocol packets 220-2) to a second host device, the second host device processes the subset of data according to the process 700. The subset of data includes various information such as a client device ID, PDR, and timestamp of the client session as illustrated. In addition or instead of this session data, other data can be received as well, such as data volume metadata and packet rate data.

Per block 703, it is determined (e.g., by the security validation module 215 of FIG. 2) whether the client device ID, the timestamp, and/or the PDR of the client session violates one or more security policies. The determination can be performed in any suitable manner according to any developer or user-defined policy. For example, in some embodiments a policy is a programming conditional statement that specifies that "while" the resource is exceeding its resource utilization threshold, "if" two or more requests or sessions have the same client device ID and are less than or equal to 1 minute apart (as determined by the timestamp ID of each request), then each session initiated by that same client device is terminated. This can include terminating (e.g., by an ISA) any future request/session associated with the same client device and deleting any current requests being buffered and processed that are associated with the same client device. In another example policy, a conditional statement specifies that "if" any request includes a payload above a certain quantity of data, the request is terminated, "else" the request is processed. In some embodiments, other security checks can be utilized such as for checking for SQL injection attacks, authorization, etc. Any combination of static or dynamic rules can be utilized.

Per block 707, if the client device ID, the timestamp, and/or the PDR of the client session does not violate a security policy, a message is transmitted to a database server (e.g., the host device(s) 205) to terminate the client session. Per block 707, if the client device ID, the timestamp, and/or the PDR of the client session does not violate a security policy, a message is transmitted to the database server to continue executing a request associated with the client session.

Figure 8:
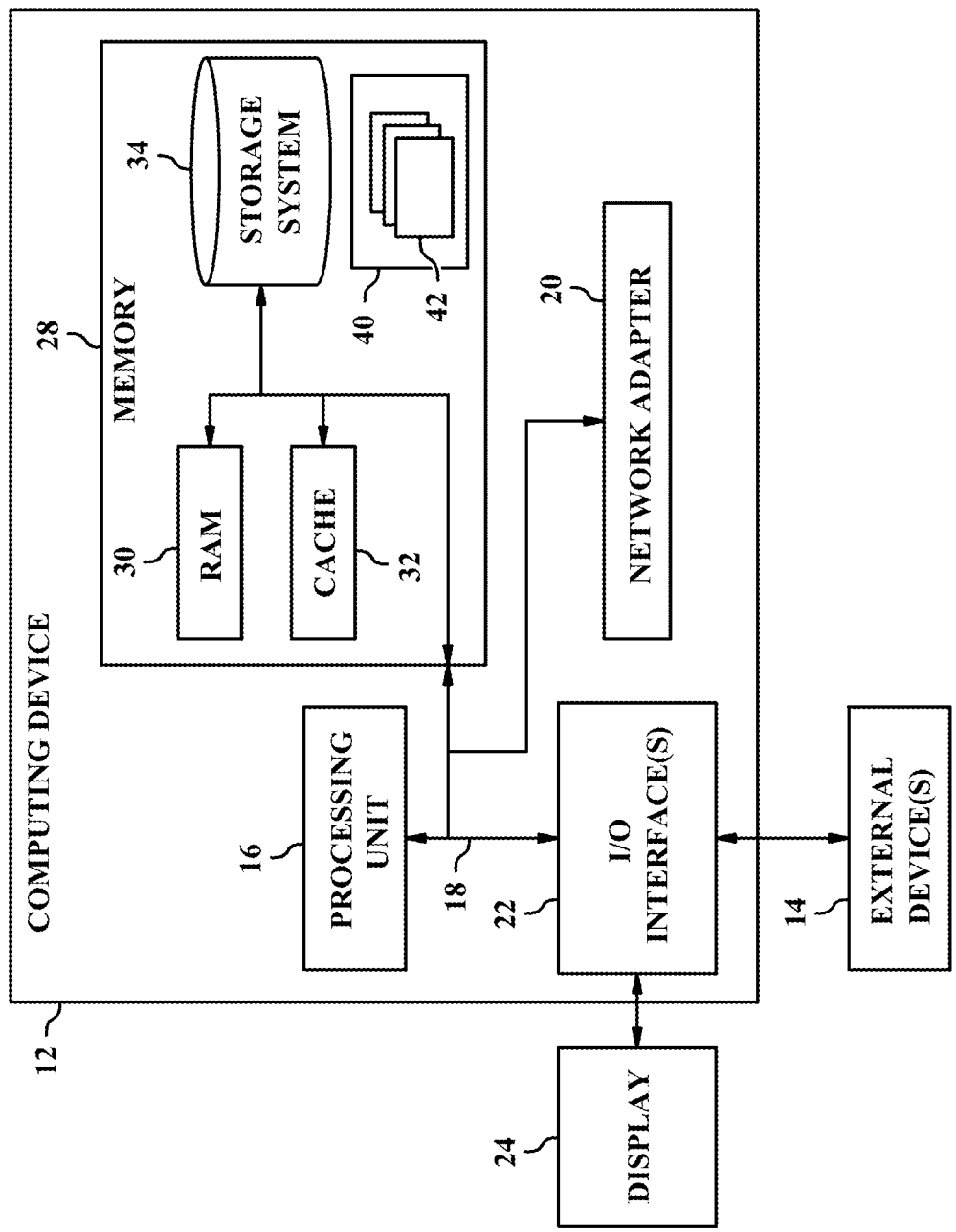
FIG. 8 is a block diagram of a computing device, according to embodiments.

FIG. 8 is a block diagram of a computing device 12, according to embodiments. As shown in FIG. 8, the computing device 12 is shown in the form of a general-purpose computing device, which is not to be construed necessarily by one of ordinary skill in the art as a generic computer that performs generic functions. Rather, the computing device 12 is illustrative only of what components a computing device may include. The components of computing device 12 may include, but are not limited to, one or more processors or processing units 16, a system memory 28, and a bus 18 that couples various system components including system memory 28 to processor 16. In some embodiments, the computing device 12 represents the user devices 102/108, the database server 104, the collectors 130, the web/application servers 106, the distributed file system 114, and/or the central security manager 132

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 12 typically includes a variety of computer system readable media. Such media may be any available media that is accessible by computing device 12, and it includes both volatile and non-volatile media, removable and non-removable media.

System memory 28 can include computer system readable media in the form of volatile memory, such as random access memory (RAM) 30 and/or cache memory 32. Computing device 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, the program modules 42 may be or include the intercepting module 207, the buffer overflow module 217, the protocol ID module 213, the parsing module 211, the security validation module 215, and/or perform any of the portion of the processes 500, 600, and/or 700.

Computing device 12 may also communicate with one or more external devices 14 such as a keyboard, a pointing device, a display 24, etc.; one or more devices that enable a user to interact with computing device 12; and/or any devices (e.g., network card, modem, etc.) that enable computing device 12 to communicate with one or more other computing devices. Such communication can occur via Input/Output (I/O) interfaces 22. Still yet, computing device 12 can communicate with one or more networks such as a local area network (LAN), a general wide area network (WAN), and/or a public network (e.g., the Internet) via network adapter 20. As depicted, network adapter 20 communicates with the other components of computing device 12 via bus 18. It should be understood that although not shown, other hardware and/or software components could be used in conjunction with computing device 12. Examples, include, but are not limited to: microcode, device drivers, redundant processing units, external disk drive arrays, RAID systems, tape drives, and data archival storage systems, etc.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The following definitions are specific to this disclosure:

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The term "causing" or "cause" means that one or more systems (e.g., computing devices) and/or components (e.g., processors) may in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

The term "computing system" means a single computing device (e.g., a mobile device) and/or multiple computing devices (e.g., multiple cloud computing notes).

The terms first (e.g., first cache), second (e.g., second cache), etc. are not to be construed as denoting or implying order or time sequences. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

What is claimed is:

1. A system comprising:
    at least one computing device having one or more processors; and
    at least one computer readable storage medium having program instructions embodied therewith, the program instructions executable by the one or more processors to cause the system to: receive, at an Intercepting Server Agent (ISA) of a database server host, a user request, the user request including one or more packets of data, wherein the ISA intercepts the user request before the user request gets executed by the database server host;
    determine, by the ISA, whether one or more buffers have exceeded an overflow threshold; and
    in response to the determining that one or more buffers have exceeded the overflow threshold, extract and transmit a first subset of the one or more packets of data to one or more External Security Mechanisms (ESMs), wherein a second subset of the one or more packets of data is not transmitted to the one or more ESMs, the one or more ESMs including one or more host devices that are physically separate from the database server host, the one or more ESMs validating the user request against one or more security policies in order to complete or terminate the user request.

2. The system of claim 1, wherein the one or more processor further cause the system to:
    receive, from the one or more ESMs and in response to the transmitting of the first subset of data, a message to terminate the user request based on the one or more ESMs determining that the user request violates the one or more security policies; and
    terminate the user request based on the message received from the one or more ESMs.

3. The system of claim 1, wherein the first subset of data that is transmitted to the one or more ESMs is user identification data, and wherein the second subset of data that is not transmitted includes a payload of data.

4. The system of claim 1, wherein the one or more buffers have exceeded the overflow threshold, and wherein the one or more processors further cause the system to:
    receive a second user request, the second user request including a second packet of data; and
    calculate, subsequent to the determining that the one or more buffers have exceeded the overflow threshold, session metadata associated with the second user request.

5. The system of claim 4, wherein the one or more processors further cause the system to:
    transmit to the one or more ESMs, the session metadata, wherein one or more payloads associated with the second user request is not transmitted to the one or more ESMs;
    and terminate the second user request based at least on one or more data units of the session metadata violating the one or more security policies, wherein the terminating of the second user request is further based on a same client device issuing the user request and the second user request.

6. The system of claim 4, wherein the session metadata is one or more units of metadata from a group consisting of: a packet rate, a data volume rate, and a server response time rate.

7. The system of claim 4, wherein the one or more ESMs are configured to report security information, over one or more routers, to a separate central security manager computing system, the separate central security manager computing system providing enterprise-level policies for a plurality of ESMs, each of the plurality of ESMs being connected to a different network.

* * * * *